(12) United States Patent
Willer

(10) Patent No.: US 6,252,755 B1
(45) Date of Patent: Jun. 26, 2001

(54) APPARATUS AND METHOD FOR IMPLEMENTING A HOME NETWORK USING CUSTOMER-PREMISES POWER LINES

(75) Inventor: Bernd Willer, Moosburg (DE)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/422,260

(22) Filed: Oct. 21, 1999

Related U.S. Application Data

(60) Provisional application No. 60/148,372, filed on Aug. 11, 1999.

(51) Int. Cl.[7] ............................................. H02H 1/00
(52) U.S. Cl. ............................ 361/119; 361/113; 361/58
(58) Field of Search ............................. 361/58, 119, 113, 361/18, 42

(56) References Cited

U.S. PATENT DOCUMENTS

| | | | |
|---|---|---|---|
| 4,597,082 | 6/1986 | Hill et al. | 371/32 |
| 4,847,782 * | 7/1989 | Brown, Jr. et al. | 364/492 |

FOREIGN PATENT DOCUMENTS

| | | | | |
|---|---|---|---|---|
| 176440 | 4/1986 | (EP) | | H02J/13/00 |
| WO 96/07245 | 3/1996 | (WO) | | H04B/3/56 |
| WO 98/33258 | 7/1998 | (WO) | | H02J/13/00 |

* cited by examiner

Primary Examiner—Stephen W. Jackson
(74) Attorney, Agent, or Firm—Leon R. Turkevich

(57) ABSTRACT

A power line filter connected to single-phase power lines (110–230 VAC, 50–60 Hz) enables transmission of HomePNA-type home network signals between network nodes connected to the main power lines as a network medium. The filter includes fuse resistors (R1, R2) that limit the current from the main power line, a transit diode circuit that clamps the bolts to a prescribed limit, eliminating energy that may be present in main power spikes. A pair of X2-type capacitors pass the 1 MHz or higher HomePNA signals, while rejecting the 50–60 Hz main power signal. A choke-type inductor eliminates any residual high voltage signals in the 50–60 Hz range by short circuiting the power signals, while maintaining a high impedance at the 1 MHz range, enabling the HomePNA signals to be safely passed to the RJ-11 connector of a physical layer transceiver of the Home Network Node.

20 Claims, 2 Drawing Sheets

APPARATUS AND METHOD FOR IMPLEMENTING A HOME NETWORK USING CUSTOMER-PREMISES POWER LINES

This application claims priority from Provisional Application No. 60/148,372 dated Aug. 11, 1999.

BACKGROUND OF THE INVENTION

1. Field of the Invention

The present invention relates to network interfacing, and more particularly to methods and systems for transmission of high-speed network signals over home power lines.

2. Description of the Related Art

Local area networks use a network cable or other media to link stations on the network. Each local area network architecture uses a media access control (MAC) enabling network interface cards at each station to share access to the media. Conventional local area network architectures use media access controllers operating according to half-duplex or full-duplex Ethernet (ANSI/IEEE Standard 802.3) protocol using a prescribed network medium, such as 10 BASE-T.

Efforts are underway to develop an architecture that enables computers to be linked together using conventional twisted pair telephone lines instead of established local area network media such as 10 BASE-T. For example, efforts are underway by the Home Phoneline Networking Alliance (HomePNA) to adopt a standard for implementing a home network using telephone lines. Situations may arise, however, where use of a telephone line as a network medium may not be desirable.

SUMMARY OF THE INVENTION

There is a need for an arrangement that provides an alternative methodology for implementing a home computer network without the necessity of conventional network media such as 10 BASE-T or telephone line media. More specifically, there is a need for an arrangement that enables a home network to be implemented using existing customer premises powerlines.

There is also need for an arrangement that enables implementation of a home network using customer-premises power lines that protects any problems associated with power lines, including protection against high voltage conditions.

There is also need for an arrangement that enables implementation of a home network using customer-premises power, lines where signal conditioning is optimized for home network signals operating at data rates of a least one megabit per second (1 Mb/s).

These and other needs are obtained by the present invention, where a filter is configured for passing home network signals to a host computer from a customer-premises power line.

According to one aspect of the invention, a filter is provided for passing home network signals to a host computer from a customer-premises power line having a power supply line and a neutral line and configured for supplying power signals. The filter includes first and second capacitors, each having an input terminal end and an output terminal end, the first and second capacitors configured for filtering the power signals received at the input terminal ends and passing to the output terminal ends the home network signals supplied by the power supply line and the neutral line respectively. The filter also includes an inductor configured for short-circuiting residual power signals at the output terminal ends and having passed the capacitors, and a protection circuit configured for limiting energy in the power signals at the input terminal ends to a prescribed threshold limit. Use of the protection circuit for limiting energy in the power signals at the input terminal ends ensures that receiver circuitry within the home network transceiver is protected from transient voltage spikes that may occur on the power line. Moreover, the inductor ensures that any residual power signals having passed the first and second capacitors are short circuited, while maintaining the home network signal. Hence, the inductor enables a near zero volt condition to be maintained at the output of the filter at the power signal frequencies, enabling a network interface to recover the home network signals from the filter.

Another aspect of the present invention provides a method of filtering home network signals from a customer-premises power line having a power supply line and a neutral line and configured for supplying power signals. The method includes passing the signals supplied by the customer-premises power line through a protection circuit configured for limiting energy to a prescribed limit, filtering the power signal having passed through the protection circuit through first and second series capacitors, configured for filtering the power signals on the power supply line and the neutral line, respectively, and passing the home network signal, and short-circuiting any residual power signals having passed through the first and second series capacitors and passing the home network signals. The short-circuiting of residual power signals ensures that all high-voltage power signals are eliminated from the home network signals, enabling the network interface device to recover the home network signals safely.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
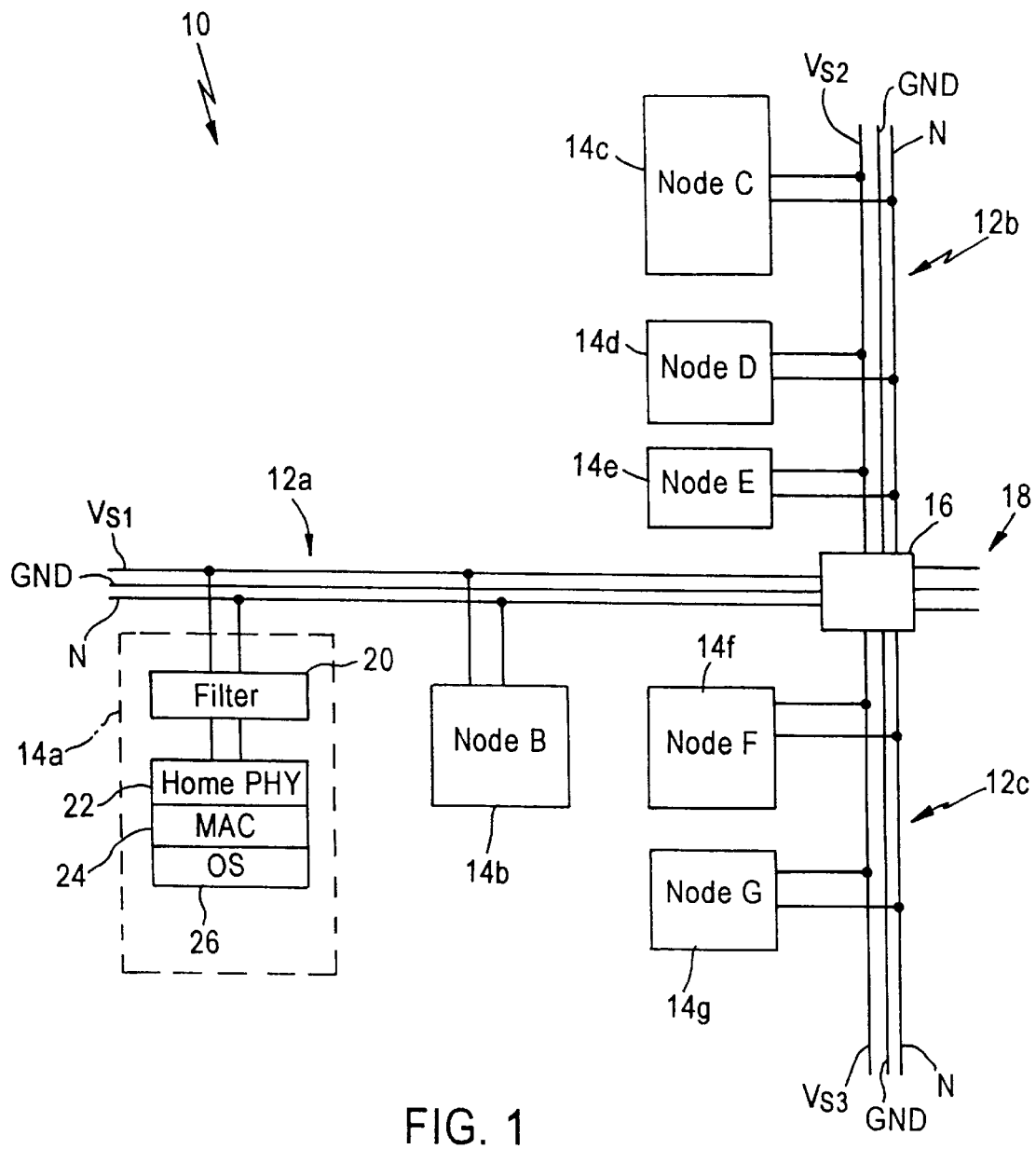
FIG. 1 is a block diagram illustrating a local area network implemented at a customer premises site using power lines as network media according to an embodiment of the present invention.

FIG. 1 is a diagram of an Ethernet (IEEE 802.3) local area network 10 implemented in a home environment using customer-premises power lines 12 according to an embodiment of the present invention. Each of the customer-premises power lines 12a, 12b, and 12c are single-phase power lines, coupled to a main distribution box 16, that may be used in a customer-premises network. For example, the customer-premises power line 12a has a power supply line $V_{s1}$, a neutral line (N), and a ground line (GND); customer-premises power line 12b has a power supply line $V_{s2}$, a neutral line (N), and a ground line (GND); and customer-premises 12c and a power supply line $V_{s3}$, a neutral line (N), and a ground line (GND). As recognized in the art, the power supply lines $V_{s1}$, $V_{s2}$, $V_{s3}$ can have different phases, for example 120 degree separation. Hence, each customer-premises power line 12a, 12b, and 12c serves as an individual shared network medium, but also could be phase coupled by a coupling network.

Each power line 12 serves a corresponding set of nodes 14 configured for sending and receiving home network signals. For example, network nodes 14a and 14b are configured for sending and receiving home network signals amongst each other across the power line 12a. Similarly, nodes 14c, 14d, and 14e are configured for sending home network signals to each other via the customer-premises power line 12b. Nodes 14f and 14g are configured for sending and receiving home network signals to each other via the power line 12c. As recognized in the art, each node may be implemented as a computer workstation, a printer, a computer having high-speed Internet access, and the like. Alternatively, any one of the nodes 14 may also be implemented as an intelligent consumer electronics device, for example a video camcorder, a digital video disc (DVD) player, and the like within a given data rate.

Each node 14 includes a filter 20 configured for passing home PNA-type network signals, and filtering the power signals supplied on the corresponding power line 12, described below. The home network signals are supplied to a physical layer (PHY) transceiver 22 configured for sending and receiving home network signals according to the Home Phoneline Networking Alliance (HomePNA) Specification 1.0. The home PHY 22 recovers the digital packet data from the home network signals, and sends the packet data via a Media Independent Interface (MII) to an IEEE 802.3-compliant media access controller (MAC) 24. The MAC 24 sends and receives data packets according to IEEE 802.3 protocol, and forwards received packets to the operating system (OS) 26 of the workstation 14.

As described above, there is a need for an alternative arrangement that enables the physical layer transceiver 22 to be connected using its RJ-11 type connector to the power lines 12. Connecting an RJ-11 type connection to a main power line, however, introduces concerns of dangerous high voltages that are typically present on the power lines 12. In addition, the power lines 12 are not configured for sending and receiving data, hence are subject to electromagnetic interference at the frequencies associated with the network signals. Hence, the power line 12 may have noise voltages with different spectral densities due to connected appliances, for example dimmers, motors, etc., as well as high energy transients that may damage the physical layer transceiver 22.

According to the disclosed embodiment, the filter 20 is specifically designed to completely filter out the power signals from the home PNA network signals, as well as any voltage spikes or transient signals that may be present at the spectral range of the power signals.

Figure 2:
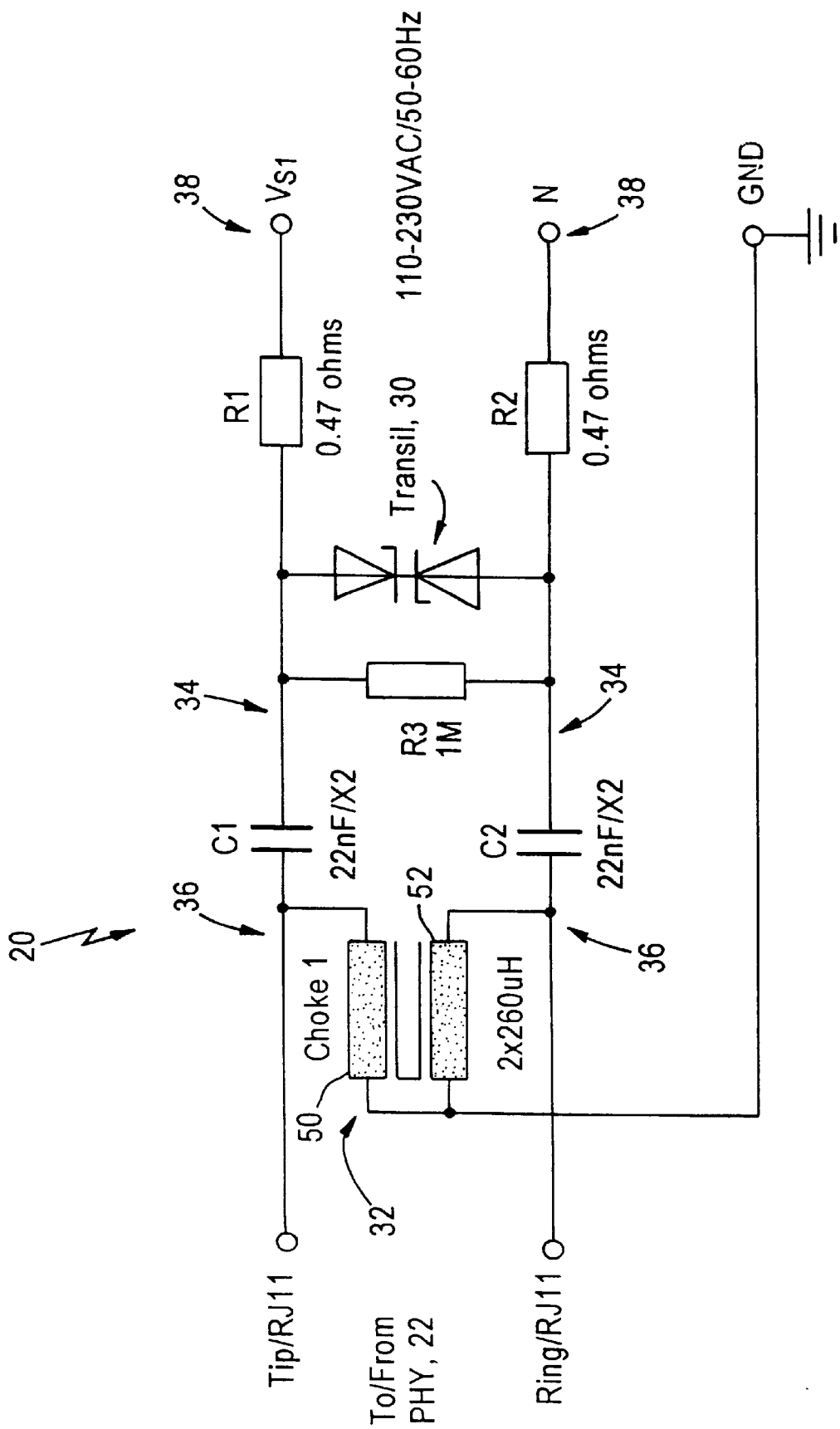
FIG. 2 is a diagram illustrating in detail the power line filter of FIG. 1 according to an embodiment of the present invention.

FIG. 2 is a block diagram illustrating in detail the filter 20 of FIG. 1 according to an embodiment of the present invention. The filter 20 is implemented as a front-end for each physical layer transceiver 22 of each node 14. In addition, the filter 20 may be added within the coupling network 16 to isolate the home network signals to the corresponding power line 12a, 12b, or 12c to preserve network security.

As shown in FIG. 2, the filter 20 include two resistors R1 and R2, a transil diode circuit 30, a resistor R3 in parallel with the transil diode circuit 30, capacitors C1 and C2, and a choke-type inductor 32. The capacitors C1 and C2 each have an input terminal end 34 and an output terminal end 36. Similarly, the resistors R1 and R2 have an input terminal end 38 coupled to the voltage supply line $V_{s1}$ and to the neutral line N, respectively. Resistors R1 and R2 also have an output end coupled to node 34.

The resistors R1 and R2 current limit the filter 20, and operate as fuses. Specifically, the resistors R1 and R2, having a resistance value of about 0.47 ohms, are implemented as safety resistors that create an open circuit condition in an overload condition, eliminating fire concerns. Each resistor is rated for about 1 watt, such that a power surge exceeding 1 watt causes the resistors R1 and R2 to open circuit. The resistors R1 and R2 also bias the transit circuit 30 described below, with a bias current to enable transil circuit 32 to operate within its prescribed operating range.

The transil circuit 30 is implemented as a pair of diodes especially designed to dissipate high peak power, and especially configured for limiting transient energy to specified voltages. In addition, the transit diode circuit 30 has a substantially low capacitance that minimizes distortion of the home PNA network signal operating above 1 Megahertz (MHz). The home PNA network signal is transmitted on the power line 12, for example at 7.5 MHz. Hence, the transit diocircuit 30 clamps the trasient energy in the 110–240 volts AC power line to about 250 volts, protecting the physical layer transceiver 22 from power surges.

The filter 20 also includes capacitors C1 and C2 that are configured for filtering the power signals at the input terminal ends 34 and passing to the output terminal ends 36 the home network signals supplied by the power supply line $V_{s1}$ and the neutral line (N). The capacitors C1 and C2 each are X2-type capacitors that are rated for power supply main voltages. In addition, the capacitors C1 and C2 have a capacitance of about 22 nanofarads (nF), causing the capacitors to reject the 50–60 Hz main power signal, and pass the high-frequency home PNA signals, which typically are above 1 MHz.

Although the capacitors C1 and C2 filter most of the 50–60 Hz main power signals, the output nodes 36 may still have a relatively small current of the high-voltage main signals. Hence, the filter 20 also include a choke-type inductor 32 configured for short circuiting the residual power signals at the output terminal ends 36 that passed the capacitors C1 and C2. In particular, the choke-type inductor 32 has a first winding 50 and a second winding 52. Each winding 50 and 52 has a first terminal end connected to the output terminal 36 of a corresponding one of the capacitors C1 and C2. The second terminal ends of the windings 50 and 52 are connected to ground, and each winding 50 and 52 has an inductance of about 260 microhenries (uH). Hence, the inductor 32 short circuits the residual power signal at the 50–60 Hz frequency range, and provides a high-impedance load for the home network PNA signal above 1 MHz, enabling the home PNA network signals to be safely supplied to the physical layer transceiver 22 without danger of overvoltage. The filter circuit 20 also includes a resistor R3, having a resistance of about 1 megaohm, in parallel with the transil circuit 30 across the input terminal ends 34. The resistor R3 is configured for discharging stored energy in the capacitors C1 and C2 and the inductor 32 in the event that there is a loss of the power signals from the power line 12. This ensures safety for the user.

Experimental tests using the above-described filter 20 have shown successful operation in transmitting home PNA-type network signals between two network nodes coupled to main power lines 12 having a range of 10–20 meters for a 1 Mb/s network According to the disclosed embodiment, a power line filter filters power line signals in the 50–60 Hz range, while passing home PNA-type network signals on the order of 1 MHz, enabling safe and reliable reception of home PNA signals via main power lines. In addition, the filter 20 protects the physical layer transceiver 20 from spurious noise and voltage spikes that may occur on the power line 12.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A filter for passing home network signals to a host computer from a customer-premises power line having a power supply line and a neutral line and configured for supplying power signals, the filter comprising:

first and second capacitors each having an input terminal end and an output terminal end, the first and second capacitors configured for filtering the power signals received at the input terminal ends and passing to the output terminal ends the home network signals supplied by the power supply line and the neutral line, respectively;

an inductor configured for short-circuiting residual power signals at the output terminal ends and having passed the capacitors; and a protection circuit configured for limiting energy in the power signals at the input terminal ends to a prescribed threshold limit.

2. The filter of claim 1, further comprising a first resistor coupled across the input terminal ends and configured for discharging stored energy in the first and second capacitors and the inductor in response to a loss of the power signals.

3. The filter of claim 2, wherein the protection circuit includes:

a transil diode circuit configured for limiting transient energy on the power signals to prescribed voltages, the transil diode circuit having a substantially low capacitance for minimal distortion of the home network signals; and second and third resistors connected in series between the input terminal ends of the first and second capacitors and the power supply line and the neutral line, respectively, the second and third resistors generating a bias current in the transil diode circuit and limiting a power level across each said second and third resistors to a prescribed threshold.

4. The filter of claim 3, wherein each of the second and third resistors is configured as a safety resistor that open-circuits in response to the power level in the corresponding resistor exceeding the prescribed threshold.

5. The filter of claim 4, wherein the prescribed threshold corresponds to about 1 Watt.

6. The filter of claim 3, wherein the power signals have a range of about 110–240 VAC, 50–60 Hz, the transil diode circuit clamping the transient energy to about 250 V.

7. The filter of claim 6, wherein the home network signals have a frequency of at least 1 MHz.

8. The filter of claim 6, wherein the home network signals have a frequency of about 7.5 MHz.

9. The filter of claim 5, wherein the second and third resistors each have a resistance of about 0.47 ohms.

10. The filter of claim 2, wherein the first resistor has a resistance of about 1 Megaohms.

11. The filter of claim 10, wherein the first and second capacitors each are X2-type capacitors having a capacitance of about 22 nanofarads and the inductor has an inductance of about 260 microhenries between each output terminal end and ground potential.

12. The filter of claim 11, wherein the power signals have a range of about 100–240 VAC, 50–60 Hz, and the home network signals have a frequency of at least 1 MHz.

13. The filter of claim 1, wherein the first and second capacitors each are X2-type capacitors having a capacitance of about 22 nanofarads and the inductor has an inductance of about 260 microhenries between each output terminal end and ground potential.

14. The filter of claim 13, wherein the power signals have a range of about 100–240 VAC, 50–60Hz, and the home network signals have a frequency of at least 1 MHz.

15. A method of filtering home network signals from a customer-premises power line, having a power supply line and a neutral line and configured for supplying power signals, the method comprising:

passing the signals supplied by the customer-premises power line through a protection circuit configured for limiting energy to a prescribed limit;

filtering the power signals having passed through the protection circuit through first and second series capacitors, configured for filtering the power signals on the power supply line and the neutral line, respectively, and passing the home network signals; and short-circuiting any residual power signals having passed through the first and second series capacitors and passing the home network signals.

16. The method of claim 15, wherein the short-circuiting step includes:

connecting output ends of the first and second series capacitors to first terminal ends of first and second windings, respectively, of a choke-type inductor, connecting second terminal ends of the first and second windings to ground, each winding of the choke-type inductor having an inductance of about 260 microhenries.

17. The method of claim 16, wherein the first and second series capacitors each are X2-type capacitors having a capacitance of about 22 nanofarads.

18. The method of claim 17, further comprising discharging the first and second capacitors and the choke-type inductor using a resistor, connected across input ends of the first and second capacitors, based on a loss of the power signals.

19. The method of claim 17, wherein the protection circuit includes a transil diode circuit configured for limiting transient energy on the power signals to prescribed voltages, the transit diode circuit having a substantially low capacitance for minimal distortion of the home network signals; and second and third resistors connected in series between the input terminal ends of the first and second capacitors and the power supply line and the neutral line, respectively, the second and third resistors generating a bias current in the trnsil diode circuit and limiting a power level across each said second and third resistors to a prescribed threshold.

20. The method of claim 19, wherein the power signals have a range of about 100–240 VAC, 50–60 Hz, and the home network signals have a frequency of at least 1 MHz.

* * * * *